July 4, 1967  J. K. ROSE  3,329,771
LIGHT SHIELD
Filed March 25, 1966  5 Sheets-Sheet 1
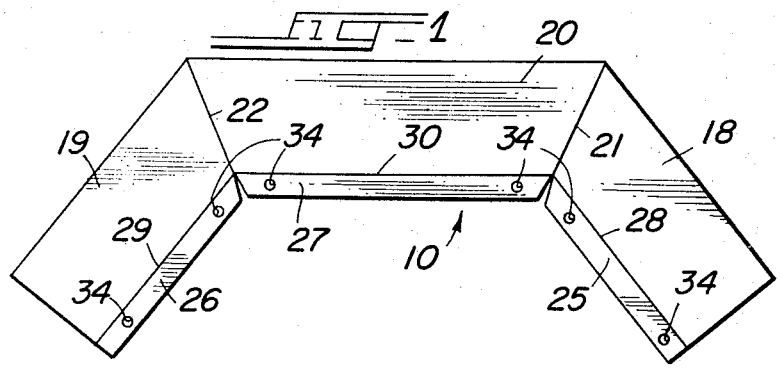
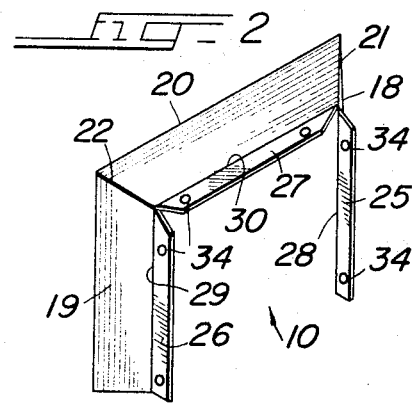
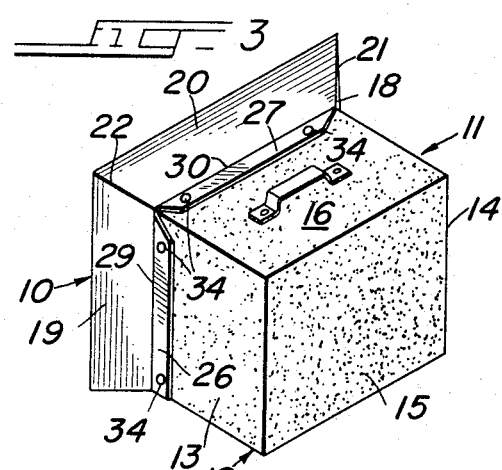
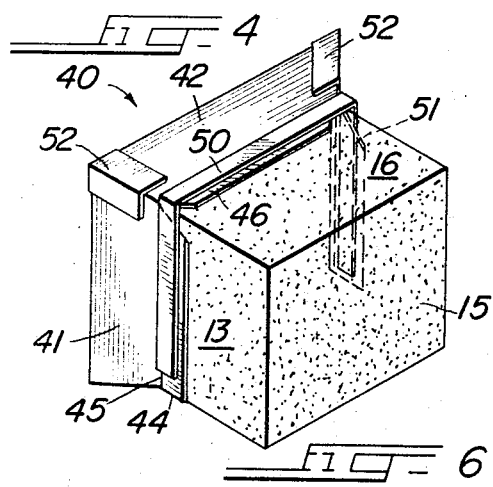
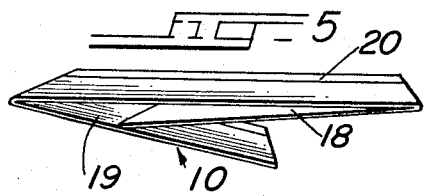
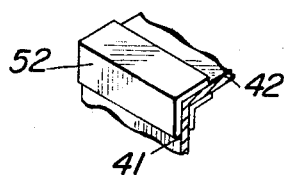
INVENTOR.
JOSEPH K. ROSE
BY
Wallace Kenzer & Dorn
Attys.

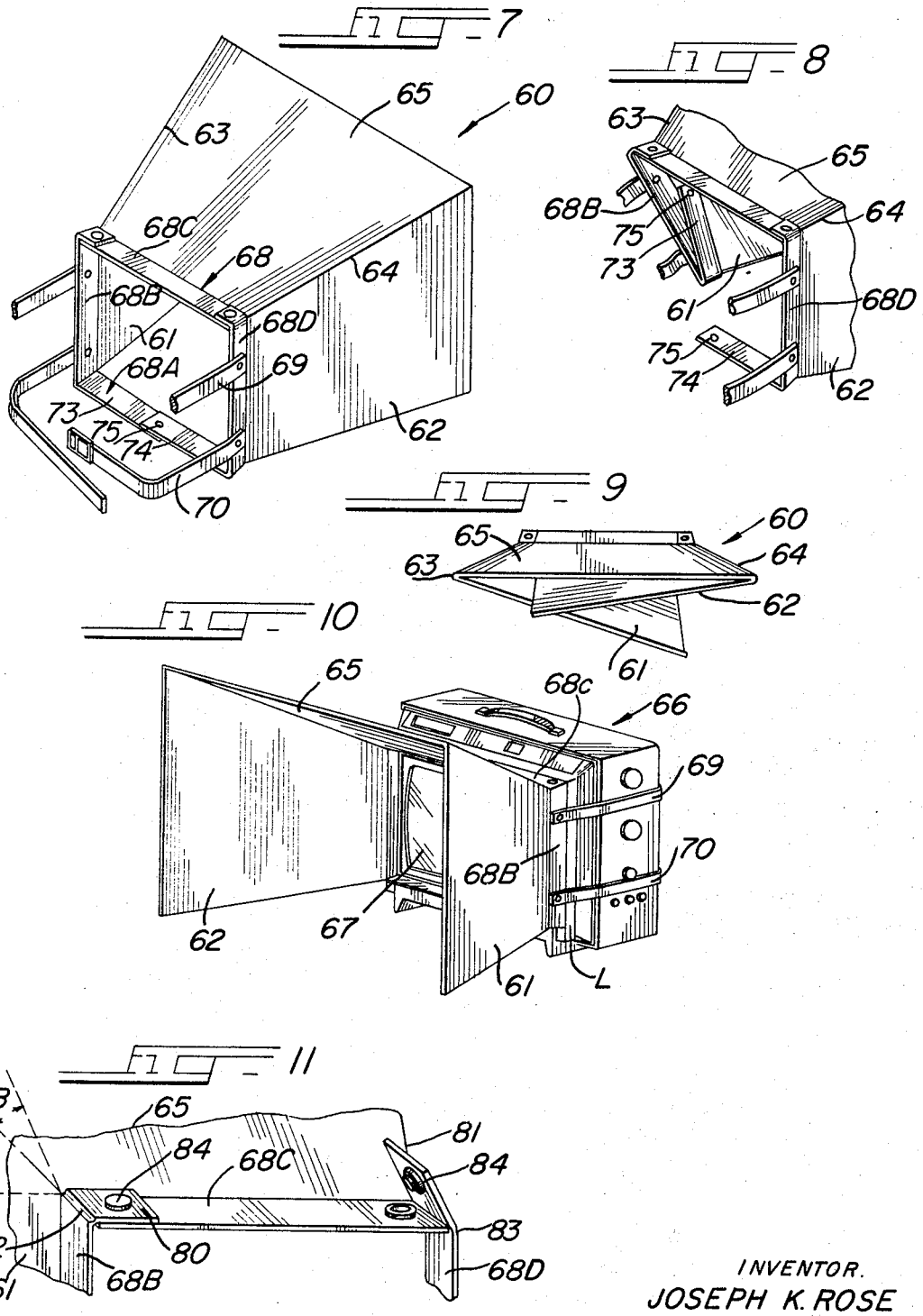

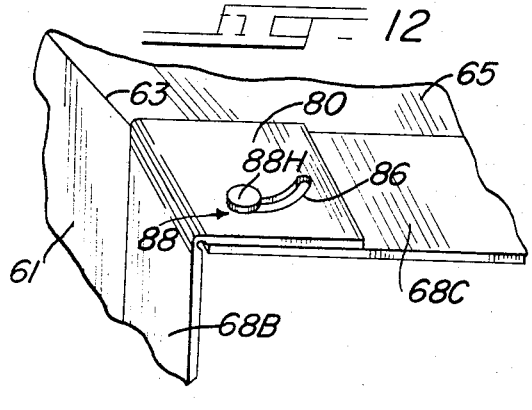
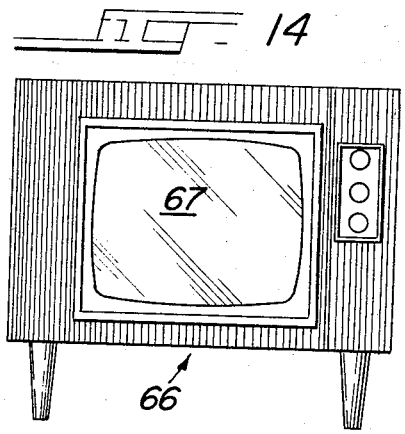
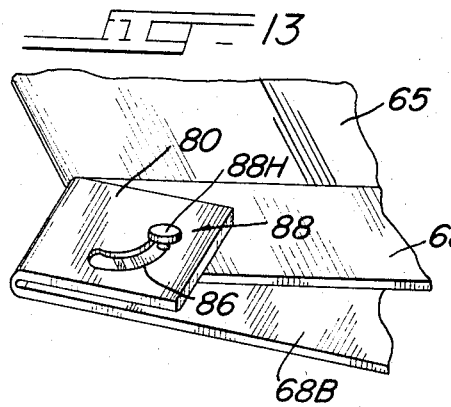
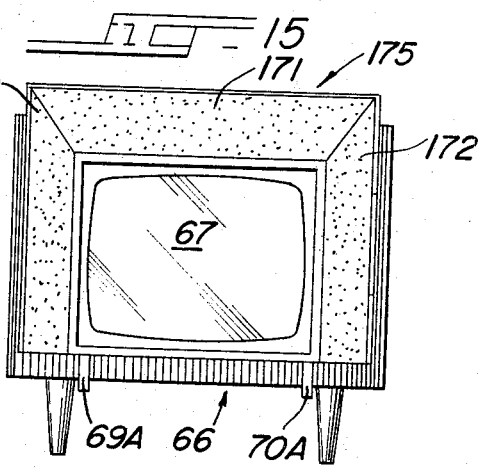
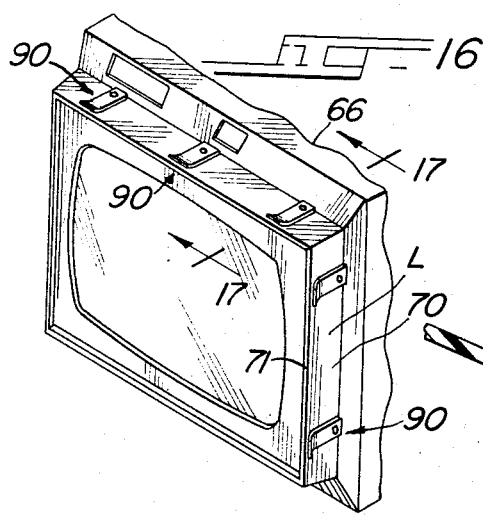
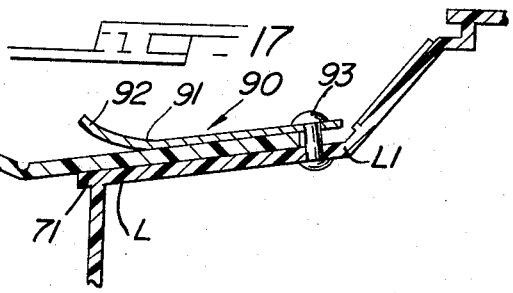

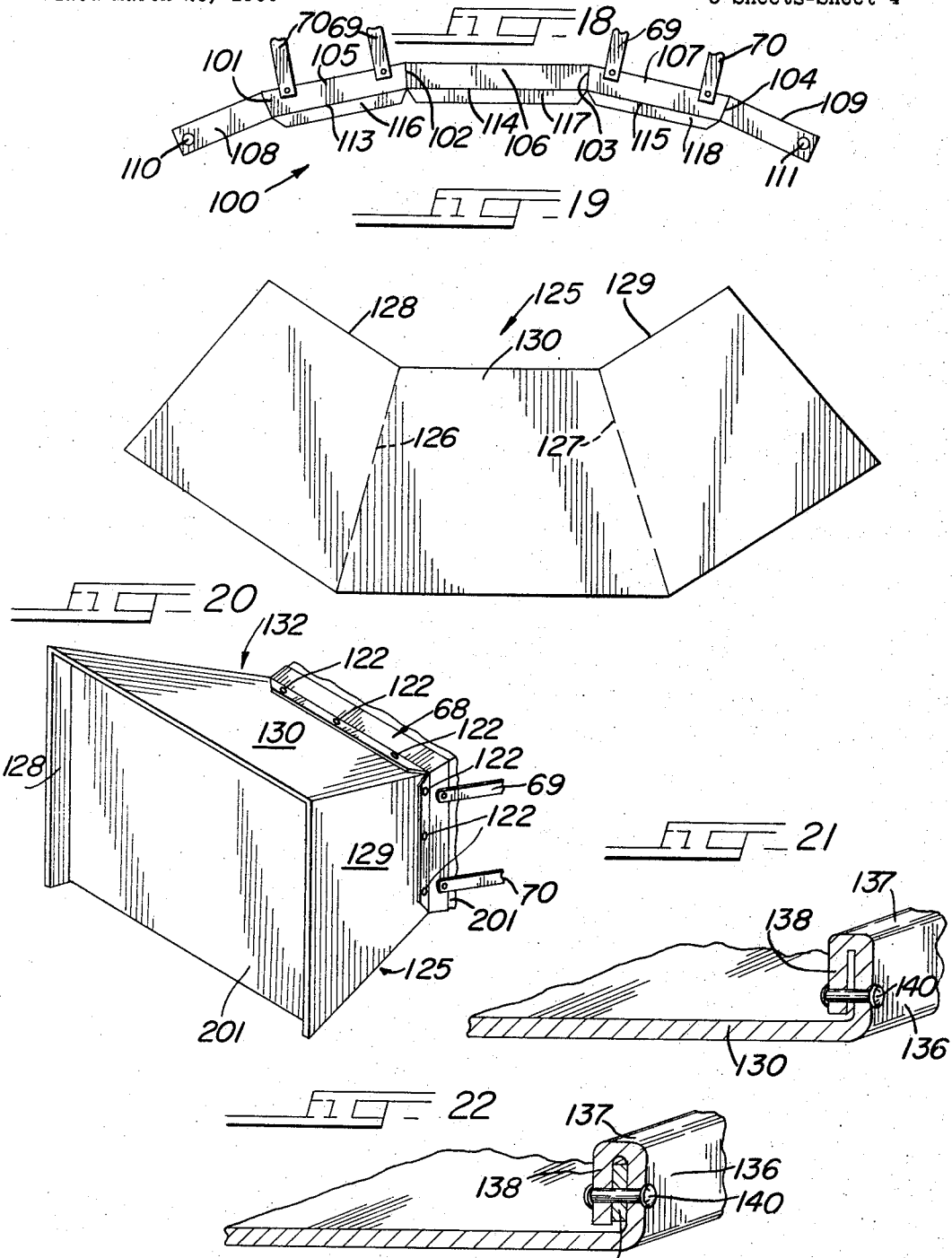

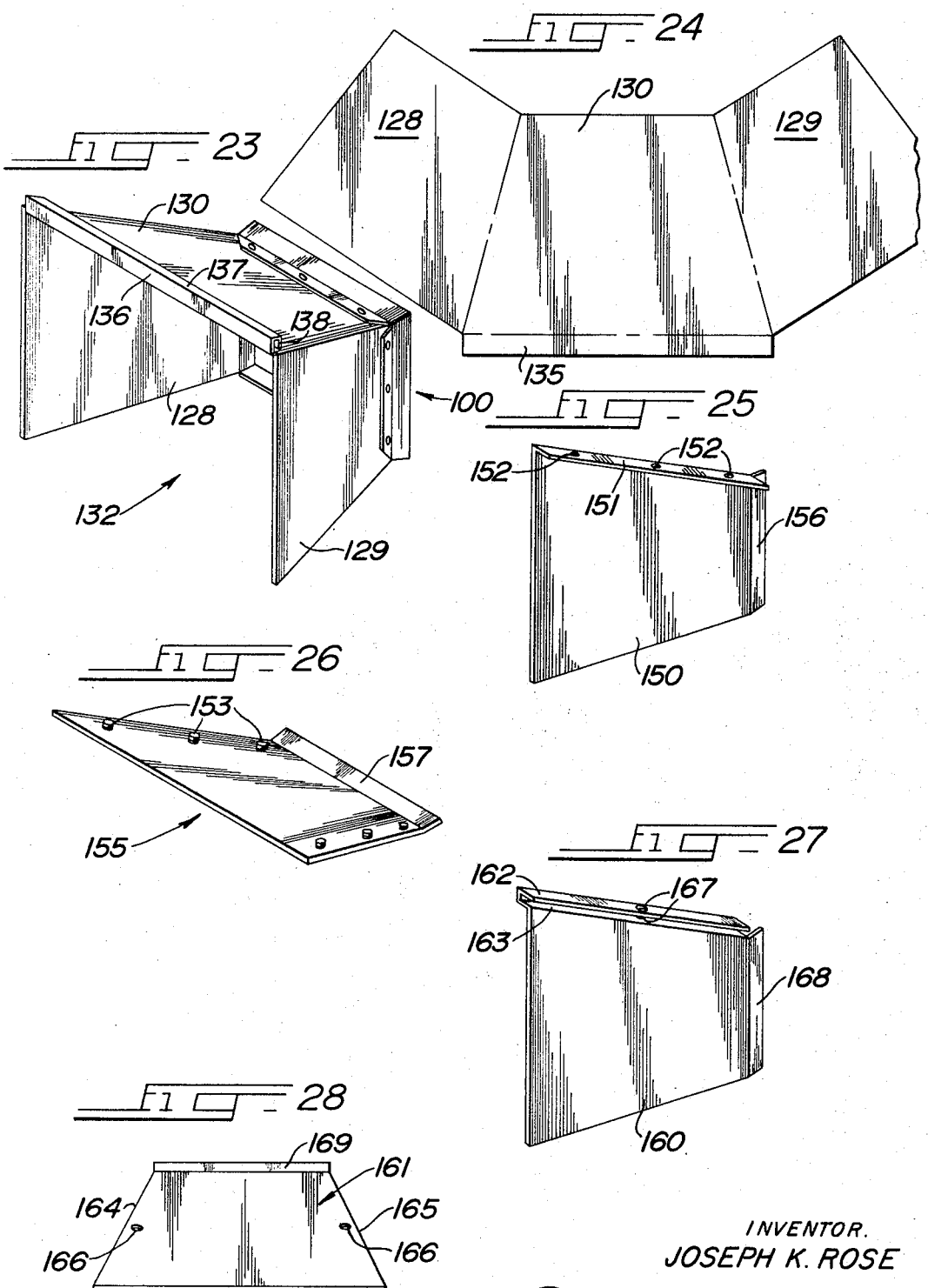

United States Patent Office 3,329,771
Patented July 4, 1967

3,329,771
LIGHT SHIELD
Joseph K. Rose, 1116 Linden Ave.,
Highland Park, Ill. 60035
Filed Mar. 25, 1966, Ser. No. 537,486
23 Claims. (Cl. 178—7.82)

ABSTRACT OF THE DISCLOSURE

A light shield assembly for use on television receivers and similar image exhibiting devices under high ambient lighting conditions; the light shield assembly includes at least three separate shield panels sequentially interconnected in a unitary structure that can be folded into a compact overlapping assembly. The shield assembly can also be opened out to a second position in which the shield panels extend outwardly of each other in a truncated pyramidal configuration. The assembly includes a strap, a flexible band, snap fasteners, clamps, or other releasable mounting means for mounting a plurality of mounting flanges on the frame of the television receiver; these flanges are individually secured to the rear edges of respective ones of the shield panels. Disengageable corner connections are provided between the mounting flanges to facilitate folding into the compact position of the assembly. A pair of partial flange members are incorporated in one embodiment to afford, with the other flange members, a continuous band encompassing the television picture tube or other image exhibiting member. The inwardly-facing surfaces of the shield panels have a flat or light-diffusing finish with a low reflection factor such that the brightness contrast with respect to the image on the television screen is minimized over a broad range of high intensity ambient lighting conditions. A neutral gray finish is used to inhibit any color combining effect between the television image and adjacent areas.

---

This is a continuation-in-part application of patent application Ser. No. 356,407, filed Apr. 1, 1964, entitled "Light Shield."

This invention relates to new and improved light shields and similar devices for television receivers, oscilloscopes, slide viewers, front or rear projection screen devices, and other image exhibiting apparatus. Although the invention is applicable to a wide variety of image display devices, it is particularly advantageous when employed with a television receiver and is described hereinafter in that connection.

A number of different constructions have heretofore been proposed for light shields to be used with television receivers, oscilloscopes, slide viewers, radar display devices, and similar image exhibiting devices. As used herein, the term "image exhibiting member" refers to any viewing screen or other image surface that presents an illuminated image, including particularly cathode ray image display devices, oscilloscopes, front and rear projection viewing screens, and the like. The simplest and perhaps the oldest proposal in this regard is a fixed light shield projecting outwardly of the image exhibiting member; a fixed construction of this kind, however, is quite impractical as applied to portable instruments and television receivers because it adds excessive bulkiness to any device with which it is employed and detracts from its appearance.

Previously known light shield constructions have employed pivotally mounted panels or folding panels that can be retracted into the cabinet of an image display device or that can be folded around the edges of the device. Two excellent examples of the latter type of shield construction are described and claimed in the patents of Joseph K. Rose, No. 3,062,917 issued Nov. 6, 1962, and No. 3,087,014 issued Apr. 23, 1963. The shield construction shown in these two patents employ angularly adjustable interfitting corner structures. The light shield assemblies can be folded or retracted, relative to the cabinets of the image exhibiting members with which they are used, and can be opened out to afford effective light shields for the image exhibiting members.

The parent application Ser. No. 356,407 from which the present application is derived describes other and substantially different forms of light shield construction. In most of the embodiments of the parent application, the shield panels can be folded to overlapped positions and provide a removable cover or carrying case for the image-exhibiting apparatus.

The present invention is directed to a fixed-angle light shield, preferably of truncated pyramidal configuration, which may be readily attached to and detached from an image exhibiting member. In the preferred forms of the present invention, the light shield assembly may be readily folded into a compact and easily portable form. Accordingly, it is an object of the invention to afford a novel and inexpensive light shield assembly hving the foregoing characteristics.

Another object of the invention is to provide a novel light shield assembly that is mounted on the frame of an image exhibiting member by a continuous semi-rigid flange that can nevertheless be folded compactly when the light shield assembly is not in use.

Another and related object of the invention is to provide for mounting of a light shield assembly on the frame of an image-exhibiting member by a series of clamps or other similar means that permit direct insertion of the light shield assembly onto the image exhibiting member and equally direct removal thereof.

As noted above, the preferred configuration for light shield assemblies constructed in accordance with the present invention is that of a truncated pyramid. In most instances, only three sides of the pyramidal configuration are presented. Furthermore, it may be desirable to afford a construction in which the top shield panel diverges outwardly of the image exhibiting surface at a different angle than the angle formed by the side shield panels with respect to that surface. In a light shield assembly of this kind, mounting flanges secured to the side and top shield panels will not ordinarily fold flat if directly hinged to each other at the shield corners.

It is a further object of the invention, therefore, to provide a light shield assembly construction with different divergence angles for the top panel and side panels that nevertheless permits completely flat folding of the light shield assembly when not in use while affording continuous corner connections for the mounting flanges of the light shield. Achievement of this object of the invention is effected by provisions for disengageable corner connections between the mounting flanges. These disengageable corner connections may include completely detachable devices such as snap fasteners; they may also include sliding connectors.

A specific object of the invention is to provide a new and improved light shield assembly suitable for mass production at relatively low cost from plastic, metal, paperboard, or other materials.

Another particular object of the invention is to provide a simple yet effective means for stiffening the front edge of a horizontal panel, in a light shield assembly, to preclude sagging of that panel.

A further object of the invention is to provide a light shield assembly in which the top and side shield panels may be quickly and conveniently disconnected from each other and disposed in flat overlapping relation for transportation or storage purposes yet may be quickly and easily assembled in operative position for use as a light shield.

In many forms of image exhibiting apparatus, the optical characteristics of the area immediately surrounding the image may be important with respect to color interpretation and with respect to eyestrain on the part of the viewer. This is true of monochrome images and may be even more important with respect to color images. It is a further important object of the invention to provide a finish for a light shield or other image surrounding shield that reduces eyestrain and makes viewing more comfortable. A specific object of the invention is to provide a surface finish for such a shield that reduces the color combining effect between the image and the surrounding area.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

In the drawings:

FIG. 1 is a plan view of a light shield constructed in accordance with a first embodiment of the invention;

FIG. 2 is a perspective view showing the light shield of FIG. 1, open and ready for use;

FIG. 3 illustrates the light shield of FIG. 2 mounted in position of use on a television receiver;

FIG. 4 shows a light shield like that of FIG. 1, but illustrating a different mounting arrangement;

FIG. 5 shows the light shield of FIG. 1 being folded for storage or transportation;

FIG. 6 is a detailed view of a corner mounting and reinforcing member used in the construction illustrated in FIG. 4;

FIG. 7 is a perspective view of a light shield assembly constructed according to another embodiment of the invention and having a continuous mounting flange;

FIG. 8 illustrates a partially folded position of the light shield assembly of FIG. 7;

FIG. 9 shows the light shield assembly of FIG. 7 in a further folded position;

FIG. 10 illustrates the mounting of the light shield assembly of FIG. 7 on a portable television;

FIG. 11 is a detail view of connections provided at top corners of the side mounting flanges for facilitating flat folding of the shield panels;

FIGS. 12 and 13 show a sliding connection that may be used between the top and side mounting flanges;

FIG. 14 illustrates a conventional television receiver;

FIG. 15 illustrates a light shield, constructed in accordance with the invention, mounted on the television receiver of FIG. 14;

FIG. 16 illustrates a series of clamps for mounting a light shield on the frame of a picture tube in a television receiver;

FIG. 17 is a sectional view, taken along lines 17—17 in FIG. 16, showing clamping of a light shield assembly on the image-reproducer frame of a television receiver;

FIG. 18 illustrates a one-piece mounting flange assembly with scored hinge lines for one embodiment of the invention;

FIG. 19 illustrates a panel assembly, formed with scored hinge lines used in one embodiment of the invention;

FIG. 20 illustrates the manner in which the panels of FIG. 19 and the flanges of FIG. 18 are attached to one another;

FIG. 21 is a cross-sectional view showing the forming of a stiffened edge portion for a panel;

FIG. 22 shows another form of stiffened panel edge;

FIG. 23 is a perspective view of a light shield panel having a stiffened front edge;

FIG. 24 is a plan view showing an additional piece of material by which to form the stiffened front edge;

FIG. 25 is a perspective view of a side panel constructed in accordance with another embodiment of the invention;

FIG. 26 is a perspective view of a top panel for use with the side panel of FIG. 25;

FIG. 27 illustrates another embodiment of the invention having a side panel formed with a slotted channel; and FIG. 28 illustrates a top panel for use with side panels of the type shown in FIG. 27.

FIG. 1 illustrates, in open plan view, a light shield assembly 10 constructed in accordance with one embodiment of the present invention. The light shield assembly 10 comprises three panels 18, 19 and 20. Panels 18 and 20 are joined to each other along a hinge line 21, whereas panels 19 and 20 are connected along a hinge line 22. Each of panels 18–20 is a solid piece and requires no provision for changes in the planar area of the panel as by extension at the corner adjoining another panel. Thus, light shield assembly 10 is a fixed-angle shield, in contrast with the variable-angle devices described in the aforementioned patents of J. K. Rose and in the initial embodiments of the parent application Ser. No. 356,407.

Panels 18–20 may be fabricated of lightweight sheet metal or may comprise sheet plastic material, relatively thin hardboard, or other suitable materials. A conventional hinge may be used to join adjacent panels, as along the hinge line 21, the hinge being screwed or otherwise affixed to the two panels. A fabric or heavy flexible plastic material may also be used to construct the hinges joining adjacent panels. These hinges may be cemented, riveted or otherwise secured to the panels. Another construction that may be utilized is to afford a pocketed plastic or fabric cover itself affording the hinges along lines 21 and 22, with appropriate stiffener sheets inserted in the panel pockets.

In addition to the main light shield panels 18–20, shield assembly 10 includes three mounting panels or flanges 25–27. Mounting flange 25 is connected to light shield panel 18 along a fold line or hinge line 28. Similarly, the mounting panels 26 and 27 are joined to light shield panels 19 and 20 along hinge lines 29 and 30, respectively.

When the light shield assembly 10 is not in use, it may be folded along hinge lines 21 and 22 to a compact unit, as illustrated in FIG. 5, in which folding is almost complete. Assembly 10 can thus be conveniently stored in a minimum space. Moreover, it can be conveniently transported, affording little bulk and being light in weight.

When the light shield assembly 10 is to be placed in use, the assembly is opened up to the three-sided truncated pyramidal configuration shown in FIG. 2. The small base of the truncated pyramid, coinciding with hinge lines 28, 29 and 30, frames the image area of the image exhibiting member with which the shield assembly is to be used. The large base of the truncated pyramid, along the outer edges of shield panels 18–20, is located forwardly of the image exhibiting member. The light shield 10 functions as an effective light shield for the image exhibiting member, shielding the image surface from external incident light which would otherwise reduce the image contrast.

Light shield 10 is mounted in position of use, with respect to an image exhibiting member, by means of the mounting flanges 25–27. One mounting arrangement is illustrated in FIG. 3, in which shield 10 is shown in operative association with a television receiver 11. The mounting flange 26 is secured to one wall 13 of television receiver 11 by suitable means such as a plurality of snap fasteners 34. Similar fasteners 34 are used to secure the mounting flange for the top panel of the shield to the top wall 16 of television receiver 10. Similar fastening members 34 (see FIGS. 1 and 2) may be utilized to mount the remaining flange member 25 on the other side (not shown) of receiver 11. Push pins or other simple fastening devices may be substituted for the snap fasteners 34, if desired.

With the three mounting panels secured to the cabinet of television receiver 11, the light shield panels 18–20 are held in fixed alignment with respect to the face of the television receiver. Because the panels are fabricated of relatively rigid material, they assume and maintain the desired shape of a three-sided truncated pyramid.

FIGS. 4 and 6 illustrate a further light shield structure or assembly 40 that is somewhat similar to light shield 10. Shield assembly 40 comprises three individual shield panels that are similar in configuration to the shield panels shown in FIG. 1; two of these shield panels 41 and 42 are shown in the perspective view of FIG. 4. Again, the panels are formed of lightweight rigid material. Panel 41 is provided with a mounting flange 44, hinged to panel 41 along line 45. Similarly, the top shield panel 42 is provided with a mounting flange 46. As before, flanges 44 and 46 extend along the sides and top walls 13 and 16 of a television receiver 11.

The mounting of shield panel on the television receiver is somewhat different in FIG. 4. An inverted U-shaped clamp member 50 extends around the top and two side walls of the cabinet of television receiver 11, tightly engaging the flanges on the light shield panel members. It is thus seen that clamp member 50 affords a quick and convenient means for mounting the light shield 40 on an image exhibiting device, in this instance the television receiver 11. It will be understood that the clamp member 50 engages a corresponding flange 51 on a third light shield panel to complete a three sided shield construction holding all three of the shield panels on the television receiver.

When the light shield is relatively large, it may be desirable to sterngthen the corners of the shield when the shield is in its position of use. This is particularly true if light-gauge material is utilized in the fabricating of the shield panels. To this end, a double-walled corner joining and reinforcing member may be employed to join the panels at each corner of the shield. One such corner joining and reinforcing member 52 is shown in FIG. 6, with the two panels 41 and 42 fitted into the recesses of the corner reinforcing member 52. A similar reinforcing member 52 may be employed at the other corner of the light shield, as shown in FIG. 4. The corner members 51 and 52 not only strengthen the corners of the assembled light shield; they also assure completion of light-tight corners. Moreover, if separate shield panels are used, as described hereinafter, the corner joining and reinforcing members assure accurate edge alignment of the shield panels.

The light shields 10 and 40 illustrated in FIGS. 1 and 4 are particularly advantageous as applied to an image exhibiting member of the front projection type. In an application of this kind, the mounting flanges of the shield panels may be secured to a frame encompassing the screen. Some form of frame is virtually always available. This makes it possible to provide effective light shielding for a front projection screen in an assembly which, nevertheless, can be quickly mounted and de-mounted and can be folded to a compact assembly when not in use.

Another embodiment of the invention is illustrated in FIGS. 7–11, and comprises a light shield assembly 60 that again is of truncated pyramidal configuration. The light shield 60 includes two side panels 61 and 62 joined at hinge lines 63 and 64 to a top panel 65. A mounting frame 68 constitutes a part of the assembly 60. The mounting frame 68 is provided with attaching straps 69 and 70 for the purpose of securing the light shield assembly 60 to an image exhibiting device 66, FIG. 10; device 66 is shown as a portable television receiver having an image exhibiting screen 67. The mounting frame 68 includes four mounting flanges 68A, 68B, 68C and 68D, which are joined together and form a rectangular frame for fitting on the rectangular frame or ledge L encompassing the picture tube 67 of the television receiver.

As can be seen even more clearly in FIGS. 16 and 17, the typical picture frame or ledge L of a portable television set also has a truncated pyramidal shape. The sides of the ledge L slope downwardly and forwardly from a large base or edge L1, FIG. 17, at the rearward edge of the ledge L to a smaller base or edge 71 formed on the front of the ledge L. The mounting frame 68 and ledge L are complementary in configuration with the mounting frame 68 having a relatively tight fit about the ledge L (see FIG. 10). The flange 68A is split into flange-halves 73 and 74 which are joined together as by a snap fastener 75 or other appropriate fastening means (FIG. 7).

An important aspect of the present invention is that the light shield assembly 60 can be folded into a generally flat configuration for convenient storage and portability. The light shield assembly 60 is illustrated, in the successive views of FIGS. 8 and 9, as being partially folded with the panel 62 being pivoted inwardly about its hinge line 64 and the panel 61 being pivoted inwardly about its hinge line 63 over panel 62. Before the pivoting of the panels to the folded position, the snap fastener 75 is unfastened. The flange-half 73 is then folded inwardly against the flange 68B and the flange-half 74 is folded inwardly against the flange 68D, as shown in FIG. 8. Thus, the light shield assembly 60 may be folded into a compact overlapping assembly (folding is nearly complete in FIG. 9) for convenience in carrying and may be opened out into an operative position, FIGS. 7 and 10, wherein the shield panels 61, 62 and 65 form three sides of a truncated rectangular pyramid with the smaller base thereof in registry with and surrounding the frame of the image exhibiting device 66.

It is thus seen that the mounting flanges 68A–68D, when the fastening means 75 is fastened, afford a continuous-band mounting means engaging the ledge or frame L of the television receiver picture tube. As in the previously described embodiment, the mounting means permits rapid and convenient mounting of the light shield in open position, ready for use. Removal for storage or transportation purposes is also both convenient and quick.

The angle chosen for the divergence of the top and side panels relative to the image screen 67 represents a compromise with respect to the amount of light shielding required for the image screen 67. The closer the panels 61, 62 and 65 approach a perpendicular relation to the plane of the viewing screen 67, the more light shielding there will be, but there will also be a decrease in the angle of vision, the angle from which the screen can be seen. Conversely, if the panels 61, 62 and 65 are swung outwardly from the perpendicular position, the angle of vision is increased and the amount of light shielding is decreased.

Experimentation indicates that a desirable angle for the top panel 65, for most installations, is about 20° to 25° above the perpendicular or, more specifically, above a horizontal plane, which is generally indicated by the angle A in FIG. 11. The side panels 61 and 62 are preferably at an angle of 12° to 18° outward from a vertical plane as represented by the angle B in FIG. 11.

When the angle A is not equal to the angle B, the side mounting flange members 68B, 68C and 68D will not lie flat in the fully folded position of the light shield assembly. In particular, the corners of the assembly cannot ordinarily be folded flat unless a correction is made as by means of a disengageable connection between the top flange 68C and the side flanges 68B and 68D. There is an exception to this rule, which occurs when the angles of divergence of the ledge or frame L of the image exhibiting apparatus differ from each other inversely with respect to the difference between angles A and B, but this situation is seldom encountered. In FIG. 11, one form of disengageable connection is shown. The connection comprises two flange extensions 80 and 81 hinged at lines 82 and 83 to the mounting flanges 68B and 68D, respectively.

snap fasteners 84 are provided for fastening the flange extensions 80 and 81 to the top flange 68C to form the band of flanges 68A–68D with continuous corners. The snap fasteners 84 are released to permit folding of the panels 61 and 62 in flat overlapping relation with the panel 65 and to allow folding of the flanges 68B and 68D in flat overlapping relation with the flange 68C.

Another means for accomplishing the flat folding of the side panels and the flanges when the angles A and B, FIG. 11, are not equal, is illustrated in FIGS. 12 and 13. A sliding connection is formed between the top flange 68C and the side flange 68B. A similar sliding connection (not shown) is provided between the flanges 68C and 68D. In FIGS. 12 and 13, the flange extension 80 has formed therein an arcuate slot 86. The slot 86 receives a pin 88 mounted on the flange 68C. The pin 88 may be a shoulder rivet having a head 88H. When the panels are folded flat, as seen in FIG. 13, the pin 88 slides in the arcuate slot 86 from the position of FIG. 12 to that shown in FIG. 13. Thus, the sliding connection 86, 88 performs the same basic function as the other form of disengageable connector, snap fastener 84.

Straps 69 and 70, FIG. 10, are exemplary of suitable fastening bands or the like, which may be employed to encompass all or a portion of the cabinet of the image exhibiting device 66. As shown in FIGS. 16 and 17, the light shield assembly 60 may be detachably mounted in place by mounting means provided on the cabinet of the image exhibiting device, thereby eliminating the need for fastening straps or bands.

As seen in FIGS. 16 and 17, the ledge or frame L of the image exhibiting member is provided with a plurality of clamps 90. Each clamp 90 includes a flexible spring clip 91 with an outwardly flared tip 92 mounted on frame L by a suitable fastener 93. The fastener 93 is shown in the form of a rivet, but may comprise a screw, push pin or other suitable means for holding the clip 91 in place.

When attaching a light shield assembly, the mounting flanges such as flanges 68B, 68C and 68D are inserted between the flexible clip members 91 and the frame L with the clip members 91 exerting a clamping force on the flanges to hold them on the frame of the image exhibiting device. The clamps 90 may be furnished by the manufacturer or may be provided separately for installation in the field. In any event, the clamps 90 provide an efficient and inexpensive means facilitating direct mounting of the light shield assembly on the image exhibiting device and allowing detachment merely by pulling forwardly until the flanges 68B–68D are removed from the clamps 90.

A light shield assembly of the present invention may be manufactured in a number of ways and from a number of suitable materials such as sheet plastic, sheet metal, paper board, or a combination of these materials. One practical technique for manufacturing the light shield assembly is described hereinafter in conjunction with FIGS. 18–20. As shown in FIG. 18, a continuous frame 100 constituting a series of flange members 105–110 aligned end to end in a single unitary band or web may be provided. The frame or web 100 may be made of polyolefin sheet plastic of approximately .060 inch thickness. The polyolefin sheet may be punched or cut in a press to the flat configuration shown in FIG. 18 with suitable hinges 101, 102, 103 and 104, formed by hot scoring dies, which reduce the thickness of the material to form transverse bendable portions constituting effective hinges. The respective hinges 101–104 separate the web into the three main mounting flanges 105, 106 and 107 and two flange-halves 108 and 109. The flange-halves 108 and 109 are provided with suitable apertures 110 and 111 for receiving snap fasteners or other fastening devices. Hinge lines are also formed at 113, 114 and 115, by hot die scoring, to provide attaching strips 116, 117 and 118. A panel assembly 125, FIGS. 19 and 20, is secured by fasteners in the form of staples or rivets 122, FIG. 20, or by other means to the respective attaching strips 116, 117 and 118. Suitable mounting straps 69 or 70 may also be attached to the mounting frame 100.

The panel assembly 125, FIG. 19, may also be made as a single unitary web. The panel assembly may, for example, be fabricated from polyolefin material with hinges 126 and 127 formed by hot die scoring between the side panels 128 and 129 and the top panel 130. Other materials may also be used to construct the shield panel web with its inter-panel hinges. For example, high impact polystyrene may be utilized, as described hereinafter.

Assembly of a complete light shield from the components of FIGS. 18 and 19 is illustrated in FIG. 20. The shield panel assembly or web 125 is first placed over a form or jig 201 with the shield panels aligned in the desired truncated pyramidal configuration. The mounting flange web, frame assembly 100, is then placed on the form with the attaching strips or extensions 114–116 overlapping the shield panels 128–130. Appropriate fastening means, such as rivets, staples, or other fasteners can then be applied to join the mounting flange assembly or frame 100 to the shield panel assembly 125.

The same basic assembly technique can also be employed if disengageable corner connections are to be provided between the individual mounting flanges, as described above.

When the top panel 130 is of relatively large size and is constructed from a thin sheet of paperboard or of a plastic material like polypropylene or polyethylene, the top panel may not have sufficient rigidity and stiffness to prevent sagging. When necessary, sagging in the top panel can be reduced or eliminated by affording a stiffening means along the front edge of the panel. One technique for forming such a stiffening means is illustrated in FIGS. 21–24. As shown in FIG. 24, the top panel 130 may be provided at its front, larger edge with an extension 135. The edge extension 135 is folded over upon itself to at least double thickness, as seen in FIGS. 21–23. That is, the extension 135 is bent upwardly to form an upstanding wall 136, a crosswise wall or fold 137 and a downwardly extending wall 138. The walls 136 and 138 may be fastened together by rivets 140, FIGS. 21 and 22, if desired. If additional stiffening is desired, a rigid reinforcing strip 139 may be mounted between the walls 136 and 138, as best seen in FIG. 22. For maximum stiffness, the strip 139 is oriented with its wider cross-sectional side in the vertical position shown in FIG. 22 with suitable rivets or other fasteners 140 holding the strip 139 in place.

The panels of the light shield may be made of high impact styrene to take advantage of its stiffness, low warpage and flat light diffusing characteristics. The high impact styrene material does not lend itself to the forming of flexible hinges by scoring; hence, it is preferred that separate hinges be afforded. For instance, a suitable metallic hinge or the like (not shown) may be employed to connect the separate panels. Another manner of securing styrene panels together is to adhere flexible vinyl material or fabric (not shown) to the adjacent styrene panels. The flexible material bends to form the hinge connections between panels. Such a method of manufacture can be readily accomplished by placing the panels on a form and cementing the flexible strips to each of the appropriate aligned adjacent panels. Manifestly, other forms of hinges and other means for securing the hinges to the panels may also be employed.

According to another embodiment of the invention, the light shield panels may be fastened to one another with fasteners to form the open ready-for-use position; the light shield panels may then be unfastened and separated for storage in a flat condition. Referring to FIGS. 25 and 26, a side panel 150 is provided with an integral flange 151 having a series of apertures 152. A complementary construction would be used for the other side panel (not shown) of the light shield. A series of studs 153 are provided along the edges of a top panel 155.

The studs 153 are placed at suitable intervals along the opposite edges of the top panel 155 for insertion through the apertures 152 in the respective side panels such as panel 150. When the top and side panels are thus assembled, appropriate retainers may be threaded onto the studs 153 to secure the top panel 155, FIG. 26, to a side panel such as 150, FIG. 25. The panels 150 and 155 may have integrally attached mounting flanges 156 and 157, respectively. Mounting straps such as 69 or 70 (FIGS. 7, 8) may be provided. Alternatively, the flanges 156 and 157 may be inserted under spring clamps 90, FIG. 16, in order to secure an assembled light shield assembly in place.

According to another embodiment of the invention, the light shield assembly may be formed by having a pair of side panels such as the side panel 160, FIG. 27, and a top panel 161, FIG. 28. The side panel 160 is formed with a U-shaped channel portion 162 affording an open slot 163 for receiving the edge 164 of the top panel 161. The other side panel of the assembly (not shown) is formed with a similar channel for receiving the other edge 165 of the top panel 161. The top panel 161 is provided with at least one opening 166 for mating with the spaced apertures 167 in the U-shaped flange 162 of the side panel 160. A suitable fastener may then be inserted through the aligned apertures 166 and 167 to interlock the side panel 160 with the top panel 161. A similar construction interlocks the top panel with the other side panel. As with the embodiment of FIGS. 25 and 26, the panels 160 and 161 may also include mounting flanges 168 and 169 for mounting the panel assembly to an image exhibiting device.

In each of the light shield assemblies of the present invention, as described above, the shield panels of the assembly open to a truncated pyramidal configuration when the assembly is in its operative position mounted upon an image exhibiting apparatus. The top panel extends forwardly at an obtuse angle with respect to the plane of the viewing screen. The side panels extend forwardly of the image surface, again at an obtuse angle. With this configuration, a reasonably wide angle of vision with respect to the image exhibiting member is permitted.

In the use of the light shields, the inwardly-facing surfaces of the shield panels are disposed in encompassing relation to the image surface and are clearly visible to an observer. This relationship is most evident in the front view afforded by FIG. 15. Thus, the shield panels mask the cabinet or frame of the image exhibiting member and may also mask other portions of the surrounding area. In the preferred form of the present invention, use is made of this masking function to improve viewing conditions and to reduce possible eyestrain on the part of the observer.

An observer viewing an image such as a television picture does not focus constantly on the precise limited area of the image itself. Instead, the observer's eyes constantly scan the image, taken in a limited area surrounding the image as well as the image itself. One of the most important causes of eyestrain in any type of viewing occurs when there is a large and abrupt brightness differential between the object being viewed and the area immediately surrounding that object.

A substantial difference in brightness may occur, for example, in a television receiver where the viewing screen is encompassed within a relatively dark cabinet. This relationship is illustrated in FIG. 14, where the picture tube 67 is surrounded by the dark cabinet of the television receiver. This presents a high brightness ratio between the television picture and the adjacent cabinet wall, which may be considered as constituting the frame of the television picture tube.

On the other hand, if the viewing screen is close to the edge of the cabinet and the receiver is in front of a wall having a light finish and a high Diffuse Reflection Factor, there can again be a high brightness ratio between the image and the surround area. This relationship could easily occur, for example, with the television receiver illustrated in FIG. 10, assuming no light shield were employed. Viewing the picture under these conditions can cause substantial eyestrain because the eye of the observer can adjust to only one level of brightness at any given time. The repeated requirements for adjustment with respect to brightness level cause rapid tiring of the eyes and viewing is shortly rendered quite uncomfortable.

The continuous shifting or scanning action of the observer's eyes also tends to cause color distortion in the image impressions received by an observer under certain circumstances. Thus, any color in the surround area encompassing the image is picked up by the scanning action of the observer's eyes and tends to thrust itself into the visual consciousness of the viewer. For example, some red or blue in the surround area would be "seen" by a viewer observing the picture on the television receiver of FIG. 14. The color in the surround area is effectively combined with the color of the actual image and becomes a part of the color in the image. This can cause over-emphasis of certain colors and is particularly objectionable in the case of color television or other forms of color images.

If, when viewing a picture on a television screen or similar image exhibiting member, the observer is visually unaware of the area surrounding the image, then the viewing conditions with respect to the surround area are correct or at least very nearly correct. Viewing under these conditions is most comfortable and eyestrain is held at a minimum. The desired conditions are achieved, in accordance with the present invention, by providing the inwardly facing surfaces of the shield panels with a finish having the following characteristics:

A. The finish is "flat" or light-diffusing rather than glossy or specular in its reflection characteristics;
B. The finish is neutral gray in color;
C. The finish has a brightness that is generally close to the average brightness of the image presented by the image exhibiting member with which the shield is employed, over a broad range of ambient lighting conditions.

Preferably, the brightness of the interior surfaces of the light shield panels is slightly lower than the average brightness of the picture, when viewing under ordinary lighting conditions. A Diffuse Reflection Factor of twenty percent to fifty percent gives a suitable brightness for television viewing over a broad range of ambient lighting conditions and precludes excessive brightness contrasts between the image and the surround area.

Where a color image is involved, the light shield surface should be a true neutral gray to preclude the color combining effect described above. In fact, a neutral gray finish is most desirable even for monochrome images.

The foregoing considerations can also be applied to a planar viewing shield or mask encompassing all or most of the immediate area adjacent to the image reproducing member. Thus, with reference to FIG. 15, it can be seen that the effect upon the brightness of the surround area, relative to the image screen 67, in the absence of excessive incident light, would be substantially similar if the light shield 175 constituted a simple planar viewing shield instead of the truncated pyramidal configuration described above. Of course, a flat viewing shield of this kind would not afford the protection against incident light that is provided by the light shields described above. Nevertheless, it affords substantial improvement in viewing conditions if the considerations listed above with respect to the interior surfaces of the light shield panels are observed as regards the outwardly facing surface of the planar mask.

Hence, while preferred embodiments of the invention have been described and illustrated, it is to be understood that they are capable of variation and modification.

I claim:

1. A light shield assembly for a television receiver, oscilloscope, slide viewer, or like image exhibiting apparatus of the kind comprising an image exhibiting member disposed within an encompassing frame, said assembly comprising:

a plurality of shield panels each having a rear edge of given length and a longer front edge and including a top shield panel interposed between two side shield panels;

connecting means, interconnecting said shield panels in a unitary structure such that said shield panels may be aligned in first and second positions, said panels, when in said first position presenting a compact overlapping assembly, and, when in said second position, extending outwardly of each other in a truncated pyramidal configuration;

mounting means for releasably mounting said assembly on said frame with said shield panels in said second position projecting forwardly of said image exhibiting member of said apparatus to shield said image exhibiting member from undesirable external incident light, said mounting means including a plurality of mounting flanges, secured to the rear edges of said shield panels, for engaging said frame to mount said assembly thereon;

said assembly further including disengageable corner connections between the mounting flange for said top shield panel and the mounting flanges for said side shield panels.

2. A light shield assembly according to claim 1, in which the angle of divergence of said top shield panel relative to said image exhibiting member is substantially different from the angles of divergence of said side shield panels relative to said image exhibiting member when said assembly is in its second position and is mounted on said image exhibiting apparatus.

3. A light shield assembly according to claim 1, said assembly further including a plurality of double-walled corner joining and reinforcing members, one for each corner of the assembly, for joining the shield panels at each corner of said assembly in aligned relation to each other, and for completing light-tight corners for said assembly, in said second position of said assembly.

4. A light shield assembly according to claim 1 in which the inwardly-facing surfaces of said shield panels, when in said second position, each present a light-diffusing surface having a brightness, over a broad range of ambient lighting conditions, generally close to the average brightness of the image presented by said image-exhibiting member, to permit comfortable viewing under conditions of high ambient illumination.

5. A light shield assembly according to claim 2 in which said disengageable corner connections comprise two flange extensions, each mounted upon one of said mounting flanges and extending toward the adjacent mounting flange at an individual corner of said assembly, and releasable fastener means for attaching each flange extension to the adjacent mounting flange in overlapping relation thereto to afford a substantially continuous connection between the mounting flanges at each corner, release of said fastener means permitting flat folding of said assembly into a compact unit with said shield panels and said mounting flanges and flange extensions overlapping each other.

6. A light shield assembly according to claim 2 in which said disengageable corner connections comprise two flange extensions, each mounted upon one of said mounting flanges and extending toward the adjacent mounting flange at an individual corner of said assembly, said sliding connection means permanently connecting each flange extension to the adjacent mounting flange in overlapping relation thereto to afford a substantially continuous connection between the mounting flanges at each corner, said sliding connection means permitting flat folding of said assembly into a compact unit with said shield panels and said mounting flanges and flange extensions overlapping each other.

7. A light shield assembly according to claim 4 in which said inwardly-facing shield panel surfaces have a Diffuse Reflection Factor of approximately twenty to fifty percent.

8. A light shield assembly according to claim 4 in which said surfaces are a neutral gray.

9. A light shield assembly for a television receiver, oscilloscope, slide viewer, or like image exhibiting apparatus of the kind comprising an image exhibiting member disposed within an encompassing frame, said assembly comprising:

at least three shield panels each having a rear edge and a front edge;

connecting means, sequentially interconnecting said shield panels in a unitary structure such that said shield panels may be aligned in first and second positions, said panels, when in said first position, presenting a compact overlapping assembly, and, when in said second position, extending outwardly of each other;

and mounting means for releasably mounting said assembly on said frame with said shield panels in said second position, projecting forwardly of said image exhibiting member of said apparatus to shield said image exhibiting member from undesirable external incident light, said mounting means including a plurality of mounting flanges, individually secured to the rear edges of respective ones of said shield panels, for engaging said frame to mount said assembly thereon;

a pair of partial flange members, individually secured to the respective flanges on the end shield members of said assembly;

and fastening means on said partial flange members for interconnecting said partial flange members to afford, with said flanges, a continuous band encompassing said image exhibiting member and engaging said frame when said panels are in said second position and said light shield assembly is mounted on said image-exhibiting apparatus.

10. A light shield assembly according to claim 9 in which the inwardly-facing surfaces of said shield panels, when in said second position, each present a light-diffusing surface having a brightness, over a broad range of ambient lighting conditions, generally close to the average brightness of the image presented by said image-exhibiting member.

11. A light shield assembly according to claim 9 in which said shield panels each have a rear edge of given length and a longer front edge, said assembly being of truncated pyramidal configuration when in its second position.

12. A light shield assembly according to claim 10 in which said shield panel surfaces have a Diffuse Reflection Factor of approximately twenty to fifty percent.

13. A light shield assembly according to claim 10 in which said surfaces are a neutral gray.

14. A light shield assembly according to claim 11, comprising a top shield panel interposed between two side shield panels, in which the angle of divergence of said top shield panel relative to said image exhibiting member is substantially different from the angles of divergence of said side shield panels relative to said image exhibiting member when said assembly is in its second position and is mounted on said image exhibiting apparatus, said assembly further including two flange extensions each mounted on one of said mounting flanges and extending toward the adjacent mounting flange at an individual corner of said assembly, and disengageable connecting means for connecting each flange extension in overlapping relation to the adjacent mounting flange at the corner, disengagement of said connecting means permitting flat folding of said assembly into a compact unit with said shield panels and said mounting flanges and flange extensions overlapping each other.

15. A light shield for a television receiver, oscilloscope, slide viewer, or like image exhibiting apparatus of the kind comprising an image exhibiting member disposed within an encompassing frame, said light shield comprising:
- a plurality of shield panels, including a top shield panel and two side shield panels, connected to each other in a unitary shield panel assembly;
- a corresponding plurality of mounting flange members, connected to each other in a unitary mounting flange assembly;
- and means for securing said mounting flange assembly to said shield panel assembly with a mounting flange member aligned with and projecting from one edge of each shield panel,
- said mounting flange members being engageable with said frame to mount said light shield on said image-exhibiting apparatus with said shield panels projecting forwardly of said image exhibiting member and outwardly with respect to each other.

16. A light shield according to claim 15 in which said shield panels are hingedly connected to each other in said shield panel assembly and said mounting flange members are hingedly connected to each other in said mounting flange assembly, and in which said securing means comprises a corresponding plurality of extensions on said mounting flange members, said extensions overlapping and being fastened to the rear edge portions of said shield panels.

17. A light shield for a television receiver, oscilloscope, slide viewer, or like image exhibiting apparatus of the kind comprising an image exhibiting member disposed within an encompassing frame, said light shield comprising:
- a panel assembly including a plurality of shield panels each having a rear edge of given length and a longer front edge;
- connecting means, sequentially interconnecting said shield panels in a unitary structure such that said shield panels may be aligned in first and second positions, said panels, when in said first position, presenting a compact overlapping assembly, and, when in said second position, extending outwardly of each other in a truncated pyramidal configuration;
- mounting means for releasably mounting said assembly on said frame with said shield panels in said second position projecting forwardly of said image exhibiting member of said apparatus to shield said image exhibiting member from undesirable external incident light, said mounting means including a plurality of mounting flanges secured to the rear edges of respective ones of said shield panels, for engaging said frame to mount said assembly thereon;
- and a plurality of individual outwardly facing clamps, mounted on said frame, for receiving and clamping said mounting flanges by direct insertion of said mounting flanges into said clamps to permit rapid attachment and detachment of said panel assembly to said image-exhibiting apparatus.

18. A light shield according to claim 17, in which each of said clamps is a leaf spring affixed at one end to said frame.

19. A light shield assembly for a television receiver, oscilloscope, slide viewer, or like image exhibiting apparatus of the kind comprising an image exhibiting member disposed within an encompassing frame, said assembly comprising:
- a plurality of shield panels each having a rear edge of given length and a longer front edge, each shield panel constituting a separate member from the other shield panels;
- releasable connecting means for connecting the side edges of said panels together in a unitary structure in which said shield panels extend outwardly of each other in a truncated pyramidal configuration, said shield panels being disconnectible from each other, by release of said connecting means, for disposition in a flat, compact, overlapping relation to each other;
- and mounting means for releasably mounting said assembly on said frame with said shield panels in said second position projecting forwardly of said image exhibiting member of said apparatus to shield said image exhibiting member from undesirable external incident light, said mounting means including a plurality of mounting flanges, each permanently attached to the rear edge of one of said shield panels, for engaging said frame to mount said assembly thereon.

20. A light shield assembly according to claim 19 in which one of said shield panels is formed with a slotted channel, extending along one side edge of the shield panel, for receiving the side edge of an adjacent shield panel.

21. A viewing shield for a television receiver, slide viewer, or like image-exhibiting apparatus of the kind comprising an image-exhibiting member disposed within an encompassing frame, said shield being of truncated pyramidal configuration encompassing at least three sides of said image-exhibiting member with the smaller base of the pyramid in registry with said image-exhibiting member and masking adjacent areas including said frame for a substantial distance on said three sides of said image-exhibiting member, the internal surfaces of said shield having a neutral gray finish inhibiting the color combining effect between the image on said image-exhibiting member and the areas adjacent thereto, said finish being light-diffusing with a low Diffuse Reflection Factor such that, over a broad range of ambient lighting conditions, the brightness contrast between said surfaces and the image on said image-exhibiting member is minimal, permitting comfortable viewing under conditions of bright ambient lighting.

22. A viewing shield according to claim 21 having a surface finish with a Diffuse Reflection Factor of approximately twenty to fifty percent.

23. A viewing shield for a television receiver, slide viewer, or like image-exhibiting apparatus of the kind comprising an image-exhibiting member disposed within an encompassing frame, said shield being of truncated pyramidal configuration encompassing at least three sides of said image-exhibiting member with the smaller base of the pyramid in registry with said image-exhibiting member and masking adjacent areas including said frame for a substantial distance on said three sides of said image-exhibiting member, said viewing shield shielding said image-exhibiting member from undesirable external incident light, the internal surfaces of said shield having a light-diffusing finish having a low Diffuse Reflection Factor, the combination of said viewing shield with said low diffuse reflection factor finish creating a relatively darkened area around said image exhibiting member permitting comfortable viewing under conditions of bright ambient lighting.

References Cited
UNITED STATES PATENTS

| | | | |
|---|---|---|---|
| 2,598,072 | 5/1952 | Rose | 178—7.82 |
| 2,837,734 | 6/1958 | Bowie | 178—7.87 |
| 3,062,917 | 11/1962 | Rose | 312—7 |
| 3,087,014 | 4/1963 | Rose | 178—7.82 |

JOHN W. CALDWELL, *Acting Primary Examiner.*

DAVID G. REDINBAUGH, *Examiner.*

J. A. ORSINO, *Assistant Examiner.*